(12) United States Patent
Johnson et al.

(10) Patent No.: US 7,819,363 B2
(45) Date of Patent: Oct. 26, 2010

(54) MOBILE CARGO LOADER WITH A THERMAL CURTAIN ENCLOSURE

(75) Inventors: Richard J. Johnson, Freeland, WA (US); Victor I. Byrnes, Mukilteo, WA (US); Michael D. Spry, Seattle, WA (US)

(73) Assignee: The Boeing Company, Chicago, IL (US)

( * ) Notice: Subject to any disclaimer, the term of this patent is extended or adjusted under 35 U.S.C. 154(b) by 708 days.

(21) Appl. No.: 11/567,781

(22) Filed: Dec. 7, 2006

(65) Prior Publication Data

US 2008/0138182 A1  Jun. 12, 2008

(51) Int. Cl.
*B64C 1/22* (2006.01)

(52) U.S. Cl. .................................. 244/137.1

(58) Field of Classification Search ............... 244/137.1
See application file for complete search history.

(56) References Cited

U.S. PATENT DOCUMENTS

| | | | | |
|---|---|---|---|---|
| 3,126,112 A * | 3/1964 | Shaw et al. | .................. | 414/495 |
| 3,147,852 A * | 9/1964 | Hanson, Jr. | .............. | 198/860.5 |
| 3,664,456 A * | 5/1972 | Smith et al. | ................ | 182/62.5 |
| 3,687,321 A * | 8/1972 | Goodhart et al. | ............ | 414/495 |
| 3,713,183 A * | 1/1973 | Belisle | ........................ | 14/71.5 |
| 4,140,141 A * | 2/1979 | Marks | ........................ | 135/136 |
| 4,333,195 A * | 6/1982 | Lichti | ........................... | 14/71.5 |
| 4,635,883 A * | 1/1987 | Hamilton et al. | ......... | 244/137.1 |
| 4,662,809 A * | 5/1987 | Sturtz et al. | ................ | 414/347 |
| 4,696,609 A * | 9/1987 | Cole | ........................... | 410/69 |
| 4,699,337 A * | 10/1987 | Lewis | ...................... | 244/137.1 |
| 4,701,097 A * | 10/1987 | Sturtz | ........................ | 414/495 |
| 4,712,339 A * | 12/1987 | Wenham et al. | .............. | 14/71.5 |
| 5,630,694 A * | 5/1997 | Ihara | .......................... | 414/495 |
| 6,447,044 B1 * | 9/2002 | Buker et al. | ............... | 296/99.1 |
| 6,474,983 B1 * | 11/2002 | Robbins | ...................... | 432/64 |
| 6,622,846 B1 * | 9/2003 | Dean | ..................... | 198/370.09 |
| 6,874,735 B1 * | 4/2005 | Audyli | ..................... | 244/137.1 |
| 6,905,095 B1 * | 6/2005 | Gruzdeva et al. | ......... | 244/137.1 |
| 2003/0219329 A1 * | 11/2003 | Ganiere | ...................... | 414/399 |
| 2006/0000951 A1 * | 1/2006 | Hennig et al. | ............ | 244/137.1 |
| 2006/0104760 A1 | 5/2006 | Cecil et al. | | |

* cited by examiner

*Primary Examiner*—Timothy D Collins
*Assistant Examiner*—Justin Benedik
(74) *Attorney, Agent, or Firm*—Law Office of Charles W. Peterson, Jr.

(57) ABSTRACT

An apparatus for controlling the environment of an internal airplane space during loading and unloading of cargo, a cargo tent for use in such transfers and a method of transfer. A collapsible cargo tent is located on a cargo transfer platform at one end of a mobile cargo lift. The collapsible cargo tent may include a collapsible frame and a cargo loader thermal curtain with a vertical strip curtain in an opening at either end. Also, the cargo tent may include a conformable flexible shield at strip curtain opening. The conformable flexible shield engages the fuselage at the door of an aircraft to form an environmental seal and the cargo loader thermal curtain forms a thermal air lock at the door such that cargo may pass through the airlock with the door open and without exposing the cargo bay to external environment.

17 Claims, 3 Drawing Sheets

MOBILE CARGO LOADER WITH A THERMAL CURTAIN ENCLOSURE

BACKGROUND OF THE INVENTION

1. Field of the Invention

The present invention generally relates to airplane cargo loaders, and more particularly, to protect airplane cargo from the environment, while cargo is being loaded and unloaded.

2. Background Description

Air cargo accounts for a major portion of air traffic today. Air cargo carriers such as AFA, DLH, CLX, SIT, CAT, KAL, CHI, UAE, for example, each operate a fleet of aircraft, primarily transporting cargo nationally and internationally for next day delivery. These carriers have been successful in transporting cargo over long distances at a cheaper price and faster than for cargo shipped with ground transportation. Since these carriers ship cargo all over the world, some cargo is likely to encounter temperature extremes, e.g., originating in extremely cold environments, such as Alaska, destined for much hotter locations like Dubai or vice versa.

Typically, the cargo is stored on the ground in some sort of a warehouse at its origination or destination point. Large items may be stored in bulk storage. Smaller items may be secured in cargo containers. Where applicable, cargo may be stacked onto pallets, 96 in. (244 cm) wide by 125-238.5 in. (318-606 cm) long. At the aircraft the cargo is loaded onto a cargo loader. The cargo loader raises and lowers the cargo and acts as a conveyer for transferring the cargo to/from the aircraft. If the aircraft is berthed on the tarmac, motorized vehicles pull a trailer or multiple chained trailers (known as cargo trains) that are loaded with cargo in bulk, pallets and/or cargo containers. The cargo trains ferry the cargo between ground storage and an aircraft.

Typically, cargo loaders are elevatable platforms that may be fixed on a motorized mobile base for positioning the loader at an aircraft in a berth on the tarmac or fixed at a jetway. An operator can either raise the platform to the cargo door of an aircraft or lower the platform to ground level or slightly there above for loading at a storage bay door or from a cargo train. With the platform elevated, cargo can be transferred to/from an aircraft cargo hold; with the platform lowered, cargo can be transferred to/from ground storage.

Frequently, a cargo load includes relatively delicate cargo that may be prone to destruction if exposed to the wrong environmental conditions, e.g., exposing tropical flowers or bananas to frigid air or chilled/frozen food or fish to tropical temperatures. Consequently, ground storage, cargo trains and aircraft cargo holds all have controlled environments, i.e., they are heated and air conditioned. Unfortunately, while the storage may be environmentally controlled, loading and unloading currently requires holding cargo bay doors open at loaders, at least until a cargo train is unloaded/loaded or the cargo bay is full/empty. Since a typical cargo bay door must be large enough for cargo container or fully loaded 10 foot (305 cm) tall pallets to pass through, holding one or more cargo bay door(s) open makes it difficult to maintain the cargo bay at its desired temperature and humidity. Consequently, this may unintentionally expose the cargo to external environmental conditions that, depending upon location and time of year, may be extreme (e.g., temperature, wind, and rain) and hazardous to the cargo.

Thus, there is a need for protecting air cargo from environmental extremes during loading and unloading and more particularly for maintaining aircraft cargo holds at their intended environmental conditions during transfers to protect the air cargo being transferred from external environmental extremes.

SUMMARY OF THE INVENTION

An embodiment of the present invention maintains and contains the cargo bay environment of an aircraft even when the cargo bay door is open and cargo is being loaded into or unloaded from the aircraft. Cargo in the cargo hold is protected from harsh and even damaging external conditions to which the cargo might otherwise be exposed with the cargo bay door being open during normal cargo loading/unloading.

More particularly, embodiments of the present invention include an apparatus for controlling the environment of an internal airplane space (such as a cargo hold) during loading and unloading of cargo, a cargo tent for use in such transfers and a method of transfer. A collapsible cargo tent is located on a cargo transfer platform at one end of a mobile cargo lift. The collapsible cargo tent may include a collapsible frame and a cargo loader thermal curtain with a vertical strip curtain in an opening at either end. Also, the cargo tent may include a conformable flexible shield at strip curtain opening. The conformable flexible shield engages the fuselage at the door of an aircraft to form an environmental seal and the cargo loader thermal curtain forms a thermal air lock at the door such that cargo may pass through the airlock with the door open and without exposing the cargo bay to external environment.

Advantageously, a cargo loader with a preferred cargo tent maintains thermal control of the cargo area interior of an aircraft with the cargo door open while loading/unloading of cargo from the aircraft. A preferred cargo tent can be stored on board the aircraft or the cargo loader, readily retrieved from storage, installed for loading/unloading and then, removed and returned to storage. Further, the preferred cargo tent is adjustable (both in frame and covering) to easily adapt to existing cargo loaders and aircraft side cargo doors for application to service most freighter aircraft. So, simply by providing aircraft with a preferred cargo tent or tents, existing ground cargo loaders may be equipped to provide preferred thermal protection without modification to the airplane or the cargo loaders.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1A:
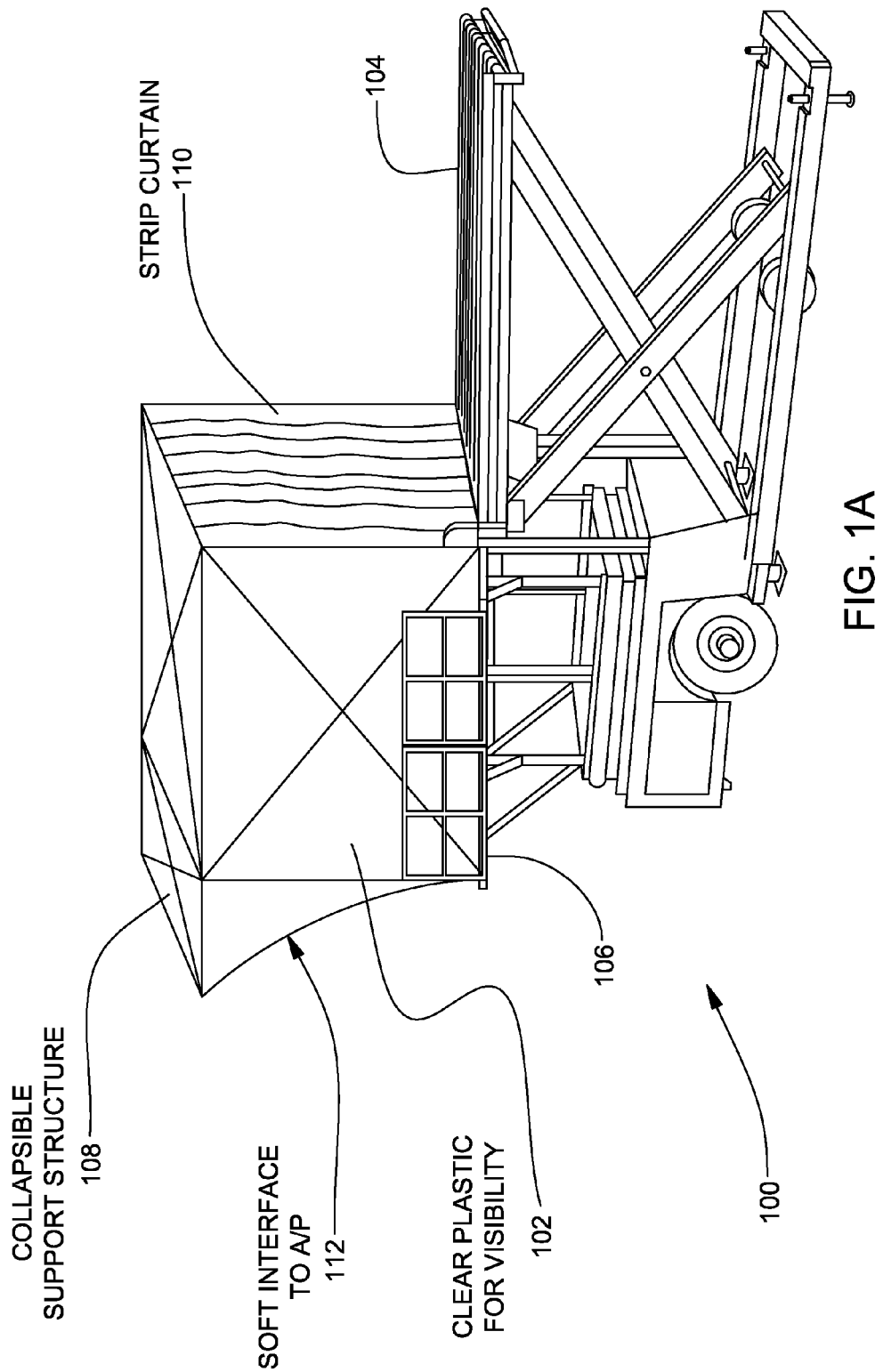
FIGS. 1A-B show examples of maintaining a constant aircraft cargo hold environment during cargo transfers according to an advantageous embodiment of the present invention.
Figure 1B:
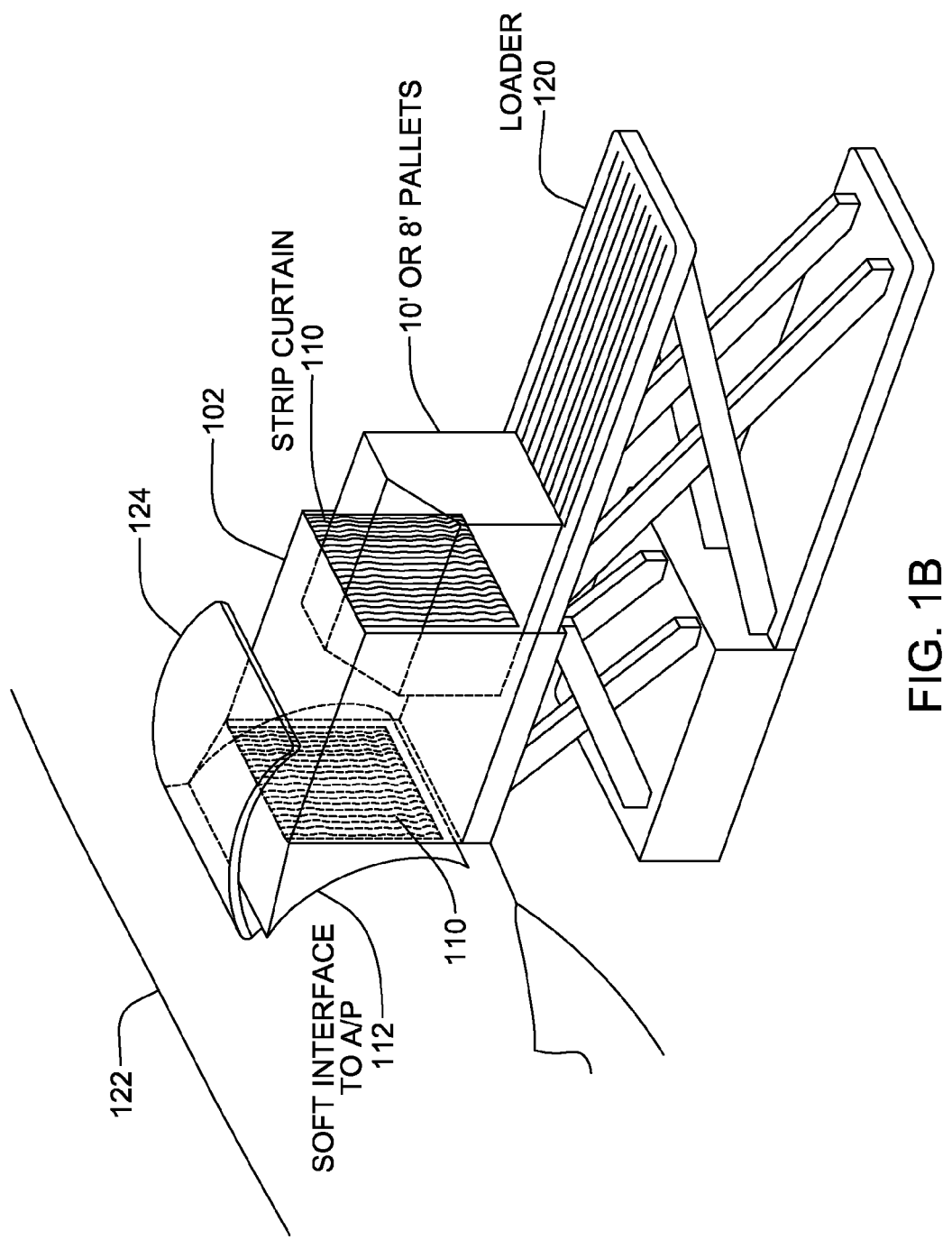

Turning now to the drawings and more particularly, FIGS. 1A-B show examples of maintaining a constant aircraft cargo hold environment during cargo transfers according to an advantageous embodiment of the present invention. FIG. 1A shows an example of a mobile cargo loader 100, e.g., a FMC MDL60 loader, with a cargo loader thermal curtain 102 providing an enclosure that acts as an external environment barrier for controlling the internal temperature of an aircraft cargo bay during loading and unloading. The mobile cargo loader 100 in this example includes a elevatable platform 104 and a transfer platform 106 that supports a collapsible frame 108 supporting the cargo loader thermal curtain 102 in a tent-like enclosure. Preferably, the collapsible frame 108 internally supports the cargo loader thermal curtain 102 like a frame tent. Thus, the cargo loader thermal curtain 102 and collapsible frame 108 collapse like a tent and the collapsed cargo loader tent (i.e., cargo loader thermal curtain 102 and collapsible frame 108, hereinafter cargo tent) may be stored on-board an aircraft or on the cargo loader 100 for use as needed.

Further, strip curtains 110 at either end of the cargo loader thermal curtain 102 complete an enclosure that defines a thermal airlock in the cargo loader thermal curtain 102. The strip curtains 110 act to maintain environmental conditions in the thermal airlock formed by the cargo tent, allowing cargo to pass through the thermal airlock as it is loaded and unloaded, while acting as an external environment barrier and without exposing the aircraft cargo bay to the environment. A soft interface 112 is located at one end of the cargo loader thermal curtain 102 for mating the cargo tent with an aircraft. The soft interface 112 acts as a gasket to further seal that end to the aircraft during transfers with the aircraft cargo hold.

FIG. 1B shows a jetway example with the thermal curtain 102 in place on a jetway cargo loader 120 at the fuselage 122 of a docked aircraft. The collapsed cargo tent is retrieved, e.g., from on-board storage or from cargo loader storage, expanded and placed on the jetway cargo loader 120. The aircraft cargo door 124 is opened and the jetway cargo loader 120 is positioned to force the soft interface 112 against the fuselage 122. The soft interface 112 acts as a gasket to sufficiently environmentally seal the cargo tent at that end. So, once in place the cargo tent acts as a semi-sealed (i.e., by strip curtains 110) thermal airlock to buffer the cargo hold from external environmental conditions, with the cargo tent effectively sealing the cargo hold from direct effects of what may be a harsh environment.

Preferably, the cargo loader thermal curtain 102 and strip curtains 110, are of a weatherproof material that is durable, flexible, and translucent or, most preferably, transparent, e.g., a clear plastic or clear vinyl having a 125 inch to 0.25 inch (0.31 cm to 0.64 cm) preferred thickness. Transparent material allows for visually inspecting the contents of cargo loader thermal curtain 102 from outside, and obviates the need to open the cargo loader thermal curtain 102 to find out whether anything remains for transfer, and allows for the transmission of ambient external light to facilitate loading operations. As noted above, the cargo tent can be collapsed like a frame tent and stored on-board an aircraft for later use. When the need arises, the collapsed cargo tent can be removed from storage expanded, fixed on the transfer platform 106 of a cargo loader, and the cargo loader can position the expanded cargo tent against the aircraft to cover an open cargo bay door.

The size of the cargo loader thermal curtain 102 is determined by intended use, including the aircraft door, the cargo loader and the type of cargo intended to pass through it, i.e., whether bulk cargo, cargo containers or pallets. So, preferably, in one direction the cargo loader thermal curtain 102 and, especially, the soft interface 112, are sized to fit the cargo bay doors on the particular aircraft for which it is intended for use. Preferably, the cargo loader thermal curtain 102 is adjustable in width and height to adapt to different size cargo doors. In addition to being large enough to cover the cargo bay door, however, the cargo tent is deep enough that, normally, at least one item (bulk item, cargo container or pallet) can be completely contained within the thermal airlock with each of the strip curtains 110 in its normal hanging position. So, for a pallet loader, the thermal curtain 102 is at least 125 inches (318 cm) deep. The strip curtains 110 include, preferably, 6 inch (15.24 cm) wide strips that are 120 inches (304.8 cm) tall, and typically the same length as the entrance/exit they are blocking.

The strip curtains 110 may be assembled from individual strips that are joined to the top of the cargo loader thermal curtain 102, overlapping by approximately 25% to preclude airflow between strips, and fixed to hang vertically from the top, so as to make a flat vertical barrier to the environment. The strips may be fixed to the cargo loader thermal curtain 102 with, for example, a metal clasp or screws.

The preferred soft interface 112 is adjustable, similar to a passenger jetway interface. When in place against an aircraft fuselage, the preferred soft interface 112 provides a seal between the cargo tent and the fuselage to provide a thermal airlock that prevents/impedes environmental conditions from encroaching on cargo in the otherwise open cargo hold.

Figure 2:
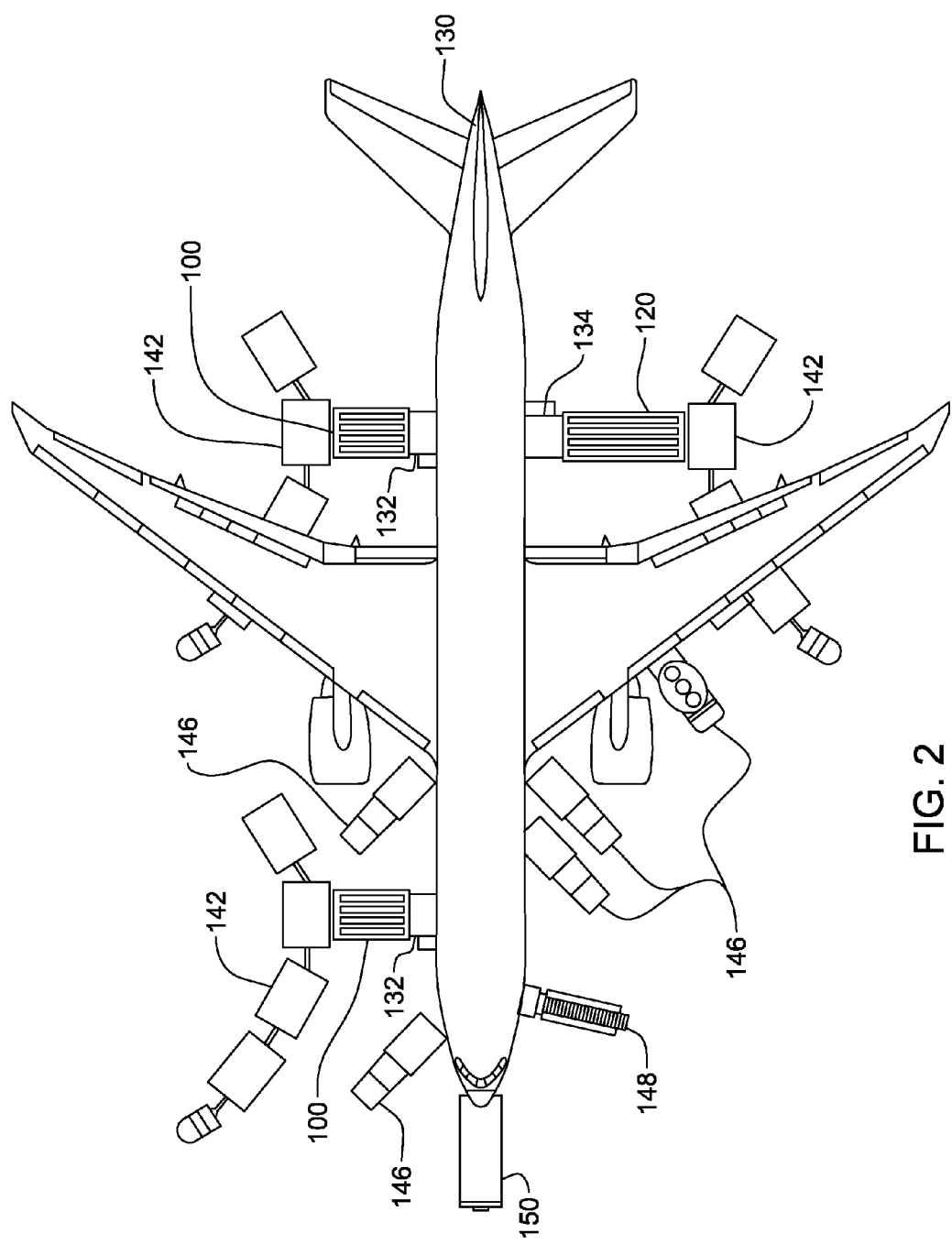
FIG. 2, shows an example of a freighter aircraft being loaded/unloaded while cargo in the cargo hold is protected from exposure to a hazardous environment.

FIG. 2, shows an example of a freighter aircraft 130, e.g., the Boeing® 777F from The Boeing Co., being loaded/unloaded according to an advantageous embodiment of the present invention. Lower lobe cargo loaders 131 (e.g., mobile cargo loaders 100 of FIG. 1A) with preferred cargo tents 132 are in place at cargo bay doors large enough to receive pallets. A main deck side pallet loader 134 (e.g., jetway cargo loader 120 of FIG. 1B) with a preferred cargo tent 136 is in place at a main deck cargo bay door. Pallet trains 142 ferry pallets between ground storage (not shown) and the freighter 130. A bulk cargo train 144 ferries bulk cargo between ground storage (not shown) and the freighter 130. Ground servicing vehicles 146 provide for other flight services and access stairs 148 provide for flight crew and maintenance crew access. The freighter 130 is pulled to its berth by a tow tractor and tow bar 150.

The aircraft 130 is moved into position and tented cargo loaders 131, 134, may be driven to the aircraft 130 to engage the fuselage and create a thermal seal or thermal air lock. With tented cargo loaders 131, 134 in place docking with the aircraft 130, temperature sensitive cargo may be transferred to/from the cargo trains 142. Each piece of cargo, whether being loaded or unloaded, passes through one strip curtain in a respective cargo tent 132, 136 until, momentarily, it is completely contained in the cargo tent 132, 136, i.e., the piece is momentarily in the thermal air lock. Then, the piece exits the cargo tent 132, 136 through the other strip curtain. Thus, preferably and depending on the spacing of cargo being loaded/unloaded, one strip curtain is closed at all times to maintain a barrier between the cargo bay and the exterior environment. Also, especially when no cargo is being transferred between loads, the cargo tent 132, 136 seals the aircraft 130. If the aircraft 130 is being unloaded, the cargo passes along the exterior conveyer for off loading to a respective cargo train 142. If the aircraft 130 is being loaded, the cargo passes into the cargo bay and the next piece is passed along from the exterior conveyer until it is emptied. Once emptied, the exterior conveyer may be lowered for further loading from a respective cargo train 142. Once loading/unloading is complete and the cargo bay doors are closed, the cargo tent 132, 136 may be removed from the cargo loader 131, 134, collapsed and stored on board the aircraft 130 or on the respective cargo loader 131, 134.

Advantageously, a preferred cargo tent maintains thermal control of the cargo area interior of an aircraft with the cargo door open while loading/unloading of cargo from the aircraft. The preferred cargo tent can be stored on board the aircraft or the cargo loader, readily retrieved from storage, installed for loading/unloading, and removed and returned to storage. Further, the preferred cargo tent is adjustable (both in frame and covering) to easily adapt as needed to fit existing cargo loaders and aircraft side cargo doors for application to service most freighter aircraft. So, simply by providing aircraft with a preferred cargo loader tent or tents, existing ground cargo loaders may be equipped to provide preferred thermal protection without modification to the airplane or the cargo loaders.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

We claim:

1. An apparatus for maintaining the environment of an internal airplane space during loading and unloading of cargo, said apparatus comprising:
a mobile cargo loader with a cargo transfer platform at one end, cargo being loaded at an opposite end;
a collapsible cargo tent on the cargo transfer platform and positionable against an aircraft fuselage, such that a cargo doorway at said aircraft fuselage is sealed by an end of said cargo tent;
an opening at opposite ends of said cargo tent, one said opening being positionable at said cargo doorway; and
a vertical strip curtain at each said, wherein said cargo loader further includes an elevatable transfer platform, cargo being loaded at said opposite end on said cargo transfer platform and passes on said cargo transfer platform to said cargo tent and said cargo tent is on an elevatable platform.

2. An apparatus for maintaining the environment of an internal airplane space as in claim 1, wherein said cargo tent comprises a collapsible frame supporting said cargo tent and a cargo loader thermal curtain and said mobile cargo loader further includes a transfer platform, cargo being loaded at said opposite end on said transfer platform and passing to said cargo tent.

3. An apparatus for maintaining the environment of an internal airplane space as in claim 2, wherein positioned at said cargo doorway said collapsible frame is adjustable such that said cargo loader thermal curtain spans said cargo doorway.

4. An apparatus for maintaining the environment of an internal airplane space as in claim 2, wherein each said vertical strip curtain is attached to said cargo loader thermal curtain.

5. An apparatus for maintaining the environment of an internal airplane space as in claim 2, wherein said cargo loader thermal curtain is a weather and thermal resistant material.

6. An apparatus for maintaining the environment of an internal airplane space as in claim 2, wherein said cargo loader thermal curtain is a transparent material and said transfer platform consists of an elevatable platform.

7. An apparatus for maintaining the environment of an internal airplane space as in claim 6, wherein said elevatable platform includes said cargo transfer platform.

8. An apparatus for maintaining the environment of an internal airplane space as in claim 2, wherein said cargo tent further comprises a conformable flexible shield at said one opening.

9. A cargo loader tent comprising:
a collapsible frame;
a cargo loader thermal curtain with an opening at opposite ends;
a vertical strip curtain at each said opening; and
a conformable flexible shield at one said opening, said conformable flexible shield being along opposite sides of said cargo loader thermal curtain and along a top of said cargo loader thermal curtain, wherein said conformable flexible shield is adapted to engage the fuselage of an aircraft, an environmental seal being formed by engagement of said conformable flexible shield with the fuselage, and wherein when said cargo loader tent is positioned on an elevatable platform at one end of a cargo transfer platform such that said conformable flexible shield is engaged with the fuselage at the door of an aircraft, said cargo loader thermal curtain forms a thermal air lock at said door such that cargo loaded on an opposite end of a transfer platform passes on said transfer platform to said cargo tent and through said airlock with said door open without external environment passing through said door.

10. A cargo loader tent as in claim 9, wherein said collapsible frame is adjustable such that said cargo loader thermal curtain spans said cargo doorway.

11. A cargo loader tent as in claim 9, wherein each said vertical strip curtain is integrally formed with said cargo loader thermal curtain.

12. A cargo loader tent as in claim 9, wherein said cargo loader thermal curtain is a weather and thermal resistant material.

13. A cargo loader tent as in claim 9, wherein said cargo loader thermal curtain is a transparent material.

14. An apparatus for loading/unloading aircraft cargo from an aircraft, said apparatus comprising:
a cargo loader positionable adjacent to an open cargo door of an aircraft; and
a cargo tent positioned on said cargo loader at one end, said cargo tent comprising:
a collapsible frame,
a cargo loader thermal curtain with an opening at opposite ends,
a vertical strip curtain at each said opening, and
a conformable flexible shield at one said opening, said conformable flexible shield being along opposite sides of said cargo loader thermal curtain and along a top of said cargo loader thermal curtain, wherein said conformable flexible shield is adapted to engage the fuselage of an aircraft, an environmental seal being formed by engagement of said conformable flexible shield with the fuselage, and wherein when said conformable flexible shield is engaged with the fuselage at the door of an aircraft, said cargo loader thermal curtain forms a thermal air lock at said door such that cargo loaded at an opposite end of said cargo loader and transported to said cargo tent passes through said airlock with said door open without external environment passing through said door;
wherein cargo pieces loaded at said opposite end are transported to said cargo tent and pass through a first said opening in said cargo tent until each cargo piece is enclosed by said cargo tent, said each cargo piece then passes through a second said opening in said cargo tent at said conformable flexible shield until said cargo piece is entirely out of said cargo tent until all cargo is loaded/unloaded, wherein said cargo tent provides a thermal air lock to each cargo piece being passed through it, such that said each cargo piece passes through said airlock with said door open without external environment passing through said door passing through said door, wherein said cargo loader further includes an elevatable transfer platform, cargo being loaded at said opposite end on said transfer platform and passes on said transfer platform to said cargo tent and said cargo tent is no an elevatable platform.

15. An apparatus as in claim 14, wherein a plurality of cargo pieces of are cargo containers and said cargo loader further includes a transfer platform, cargo being loaded at said opposite end on said transfer platform and passes on said transfer platform to said cargo tent.

16. An apparatus as in claim 15, wherein each said vertical strip curtain is attached to said cargo loader thermal curtain and said transfer platform is an elevatable platform.

17. An apparatus as in claim 14, wherein a plurality of cargo pieces are cargo pallets.

\* \* \* \* \*